United States Patent
Kang et al.

(10) Patent No.: US 6,782,252 B1
(45) Date of Patent: Aug. 24, 2004

(54) APPARATUS AND METHOD FOR TRANSMITTING CALL HOLDING MESSAGE IN MOBILE COMMUNICATION TERMINAL

(75) Inventors: Sung Chul Kang, Seoul (KR); Tae Eun Choe, Kyunggi-do (KR)

(73) Assignee: LG Information & Communications, Ltd., Seoul (KR)

( * ) Notice: Subject to any disclaimer, the term of this patent is extended or adjusted under 35 U.S.C. 154(b) by 472 days.

(21) Appl. No.: 09/599,613

(22) Filed: Jun. 23, 2000

(30) Foreign Application Priority Data

Jun. 26, 1999 (KR) ........................................ 1999-24491
Jul. 15, 1999 (KR) ........................................ 1999-28705

(51) Int. Cl.⁷ .......................... H04M 3/42; H04M 11/10
(52) U.S. Cl. ................. 455/414; 455/412.2; 455/550.1; 379/80; 379/88.12
(58) Field of Search ......................... 455/412.1, 412.2, 455/414.1, 517, 575.1, 567, 550.1, 413, 415, 72; 379/80, 70, 84, 88.04, 88.11, 88.12, 88.14

(56) References Cited

U.S. PATENT DOCUMENTS 5,630,205 A * 5/1997 Ekelund ..................... 455/412
6,018,671 A * 1/2000 Bremer ....................... 455/567
6,216,016 B1 * 4/2001 Cronin ........................ 455/567
6,275,690 B1 * 8/2001 Higuchi et al. ............. 455/412
6,424,822 B1 * 7/2002 Mekuria et al. .............. 455/72
6,456,696 B1 * 9/2002 Fargano et al. ............... 379/70

* cited by examiner

*Primary Examiner*—Simon Nguyen
(74) *Attorney, Agent, or Firm*—Fleshner & Kim, LLP

(57) ABSTRACT

A call holding voice message transmitting apparatus and method in a mobile communication terminal are disclosed that transmit voice data, preferably stored in the terminal, to a caller in a situation in which the user of the terminal cannot receive an incoming call from the caller. The apparatus can include a key input unit to input a command to the terminal, a controller that generates a control signal adapted to execute the command, a microphone that converts a voice into an analog voice signal and a voice encoder that converts the analog voice signal into a digital voice signal. A memory can retrievably store the digital voice signal outputted from the voice encoder and a voice decoder converts the digital voice signal into an outgoing analog voice signal. A selection device outputs a selected one of the analog voice signal from the microphone and the outgoing analog voice signal from the voice decoder in response to the control signal from the control unit. Finally, a backward speech channel unit can convert the analog voice signal outputted from the selection device into a signal meeting a transmission system used in association with the terminal.

8 Claims, 4 Drawing Sheets

Fig. 5

| ADDRESS | CONTENT OF MESSAGE |
|---|---|
| 1 | Hello, this is Kildong Hong. |
| 2 | I can't receive your call now.<br>Please call me next time. |
| 3 | I will receive your call in a moment, but I am unable to have more than a very limited conversation with you owing to unavoidable circumstances. |
| 4 | Please wait a moment.<br>I will receive your call after moving to another area. |
| 5 | I can't receive your call now.<br>Please leave a message. |
| 6 | Please wait a moment. Don't hang-up. |
| 7 | Sorry, please wait a moment and don't hang-up, if your call is important. |
| ⋮ | ⋮ |

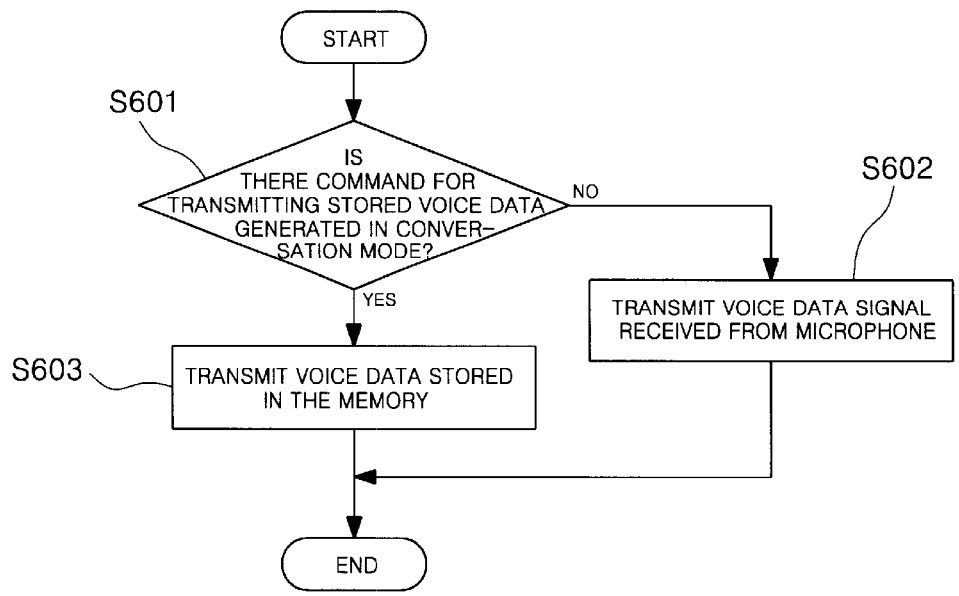

Fig. 6

APPARATUS AND METHOD FOR TRANSMITTING CALL HOLDING MESSAGE IN MOBILE COMMUNICATION TERMINAL

BACKGROUND OF THE INVENTION

1. Field of the Invention

The present invention relates to a mobile communication system, and more particularly to an apparatus and method for transmitting a call holding voice message in a mobile communication terminal.

2. Background of the Related Art

Generally, mobile communication terminals have basic functions for making and receiving calls. When a user makes a call using a keypad in accordance with a variety of dialing methods to dial the telephone number of a counterpart (i.e., called party), who is to receive the call, the call is transmitted to the counterpart. When the called party responds to the call from the calling party, he can enter into a telephone conversation with the caller. The dialing methods may include a method in which the entire combination of digits of a desired telephone number is inputted, a method in which an entry number assigned as an abbreviated dial number for a desired telephone number is inputted, a method in which the last four digits of a desired telephone number are inputted, or a method in which a voice recognizable as a desired telephone number is inputted.

When the calling party or the called party desires to transmit a message to the counterpart during the course of a telephone conversation, he should transmit the message in the form of a voice by directly vibrating the vocal cords. However, it may be often difficult to transmit a message in the form of a voice due to personal reasons or surrounding circumstances. For example, it is difficult for the user of a mobile communication terminal to accurately transmit an intended message in the form of a voice to the counterpart when the user is located in a public area, such as a concert hall or a theater, which require observance of the proprieties of telephone communications, when the user is in conference or at a table, or the user is under severe noisy circumstances.

FIG. 1 is a flow chart illustrating a related art procedure for responding to an incoming call in a mobile communication terminal. The related art call responding procedure carried out in the mobile communication terminal will now be described.

As shown in FIG. 1, the procedure starts and continues to step S101. When the user of the terminal receives an incoming call under the condition in which he is located in a public area such as a library or in conference, calling bells or vibrations are generated from the terminal in response to the incoming call in step S101. If it is determined in step S102 that a response to the incoming call can be made, the user opens the flip cover of the terminal or depresses a call reception button after moving to an area where he can respond to the incoming call. Then, the user responds to the incoming call and enters into a telephone conversation with the caller in step S103.

Under a situation in which the user cannot respond to the incoming call in step S102, a reception-impossible message is transmitted to the caller after a predetermined period of waiting time in step S104. For example, the reception-impossible message may be "[t]he user cannot respond to the incoming call now." Alternatively, the reception-impossible message may be "[d]o you want to leave a message in a voice box?". In response to the reception-impossible message, the caller may immediately stop the call or stop the call after leaving a desired voice message in the voice box provided by a server.

However, as described above, the related art call responding procedure has various disadvantages. For example, the related art call responding procedure has a disadvantage in that while the user is in the process of moving to an area where he can respond to the incoming call, the caller may have a consideration that it is impossible for the user to receive the call so that the caller hang up to stop the call. In such a case, the user cannot engage in a telephone conversation with the caller. This may cause a serious disadvantage when the telephone conversation is associated with an important affair. Further, the caller leaves a voice message in the voice box, there is an inconvenience in that the user should connect to the server of mobile communication service in order to hear the message.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

An object of the present invention is to provide a mobile communication terminal and method of using same that solves one or more problems caused by disadvantages in the related art.

Another object of the present invention is to provide a voice data storing apparatus and method in a mobile communication terminal that transmit a call holding message to a caller in response to an incoming call from the caller.

Another object of the present invention is to provide a voice data storing apparatus and method in a mobile communication terminal that transmit a prestored call holding voice message to a caller in a call holding message mode that informs the caller the user will answer shortly or cannot answer because of the user's location/circumstance prior to voice mail connection being handled in responding to an in coming call from the caller.

Another object of the present invention is to provide a voice data storing apparatus and method in a mobile communication terminal that store voice data of the user in a memory equipped in the terminal to transmit the stored voice data to a caller in a situation in which it is impossible for the user to enter into a telephone conversation with the caller in response to an incoming call from the caller.

Another object of the present invention is to provide a call holding voice message transmitting apparatus and method in a mobile communication terminal that can transmit voice data stored in a memory of the terminal to a caller in accordance with a desired key input by the user in a situation where the user cannot enter into a telephone conversation with the caller in response to an incoming call from the caller, which allows the user to accurately transmit an intended message to the caller.

In order to achieve the above objects in a whole or in part, the present invention provides an apparatus for transmitting a call holding voice message in a mobile communication terminal that includes an input unit that inputs a command to the terminal; a control unit that generates a control signal adapted to execute the command from the input unit; a first converter that converts a voice inputted to the terminal, into a corresponding first analog voice signal; a second converter that converts the first analog voice signal outputted from the first converter into a first digital voice signal; a memory allocated with a plurality of memory addresses, wherein the memory allocates a selected one of the memory addresses for the first digital voice signal; a multiplexer that receives the first and the second digital voice signals and outputs a selected one of the first and second digital voice signals in response to the control signal received from the control unit; and an output converter that converts the selected digital voice signal from the multiplexer into a signal meeting a transmission system used in association with the terminal.

To further achieve the above objects in a whole or in part, the present invention provides a method for transmitting a call holding voice message in a mobile communication terminal that includes receiving voice data corresponding to a call holding voice message to be transmitted to a caller in response to an incoming call from the caller; storing the received voice data in a retrievable format in the terminal; receiving a selection signal selecting the received voice data in response to the incoming call from the caller in a conversation mode of the terminal; and retrieving the voice data in response to the selection signal, converting the retrieved voice data into data meeting a transmission system used in association with the terminal.

To further achieve the above objects in a whole or in part, the present invention provides a method for transmitting a call holding message in a mobile communication terminal that includes storing voice data corresponding to a call holding message in the terminal; setting an incoming call holding mode for the terminal; and transmitting the call holding voice message stored in the terminal to a caller in the incoming call holding mode in response to an incoming call.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a schematic view illustrating an exemplary variety of voice data stored in a memory unit of the terminal shown in FIG. 2 or FIG. 3;

FIG. 6 is a flow chart illustrating a preferred embodiment of a call holding voice message transmitting method in accordance with the present invention.

DETAILED DESCRIPTION OF PREFERRED EMBODIMENTS

Figure 1:
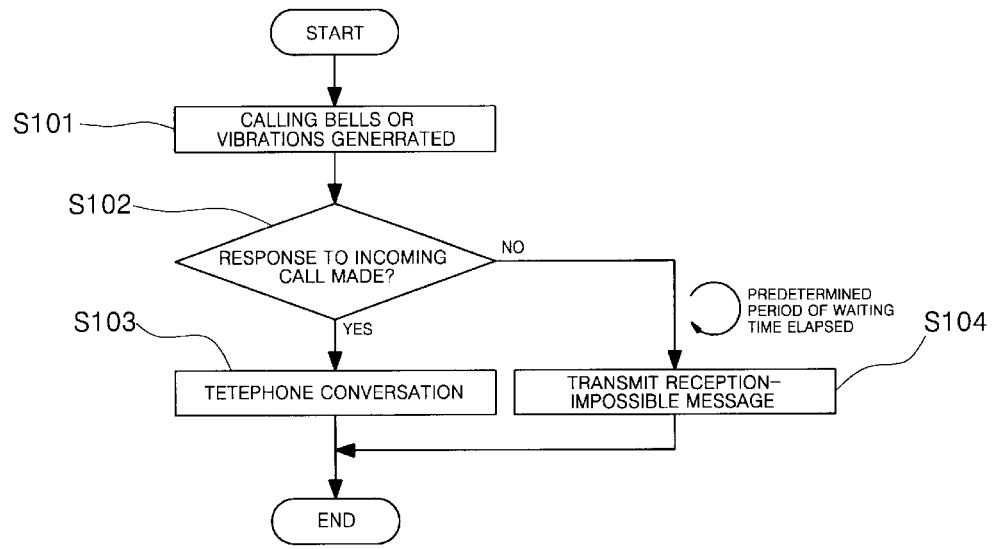
FIG. 1 is a flow chart illustrating a related art procedure for responding to an incoming call in a mobile communication terminal.
Figure 2:
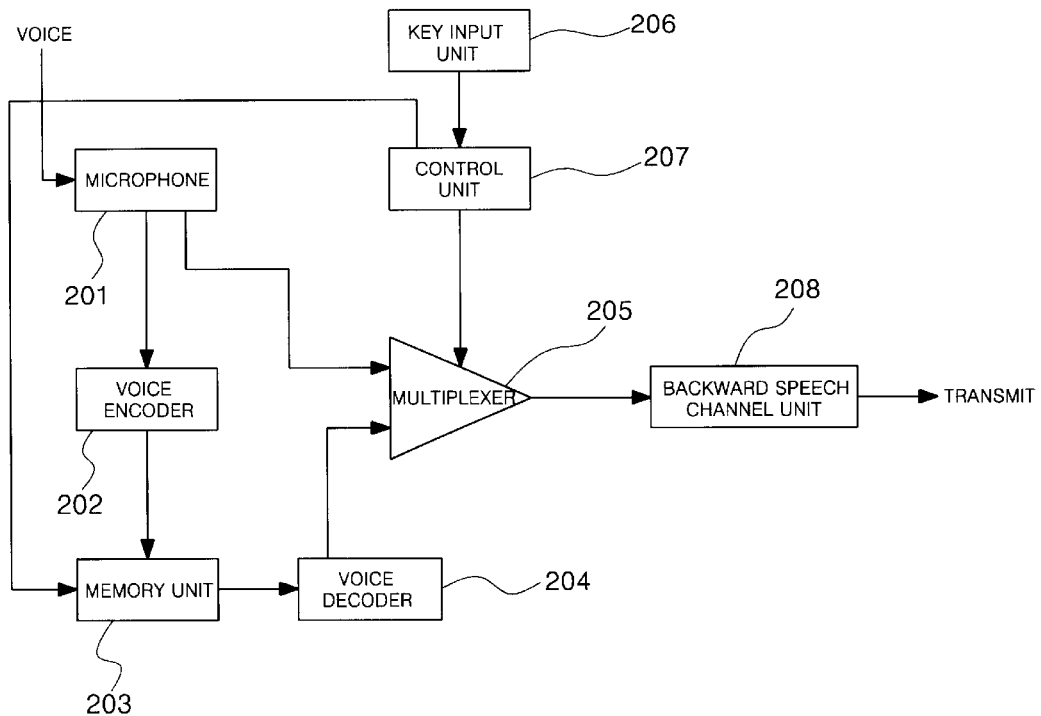
FIG. 2 is a block diagram illustrating a preferred embodiment of an apparatus for transmitting a call holding voice message in a mobile communication terminal in accordance with the present invention.

FIG. 2 is a block diagram illustrating a first preferred embodiment of an apparatus for transmitting a call holding voice message in a mobile communication terminal according to the present invention. As shown in FIG. 2, the call holding voice message transmitting apparatus according to the first embodiment includes a microphone 201, a voice encoder 202, a memory unit 203, a voice decoder 204, a multiplexer 205, a backward speech channel unit 208, a key input unit 206, and a control unit 207.

Operations of the first preferred embodiment of the apparatus will now be described. To allow a transmission of a call holding voice message in the first preferred embodiment of the call holding voice message transmitting apparatus, it is necessary to previously store the call holding voice message in the mobile communication terminal to which the call holding voice message transmitting apparatus is applied.

To this end, the microphone 201 serves to convert a voice received from the user into a corresponding analog voice signal which is, in turn, applied to the voice encoder 202. In the voice encoder 202, the analog voice signal is encoded in a compressed digital voice signal so that it is allowed to be stored in the memory unit 203.

The memory unit 203 receives the digital voice signal from the voice encoder 202, and then stores it in a memory location corresponding to a memory address allocated in accordance with a control signal generated from the control unit 207 preferably in response to a key input from the key input unit 206. However, the present invention is not intended to be so limited. Typically, the key input unit 206 generates a mode designation signal and a variety of key codes. Repeating these procedures can be performed to store additional compressed digital voice signals in the mobile communication terminal.

Thus, the memory unit 203 is stored with a variety of digital voice signals in its memory locations respectively corresponding to different memory addresses. A desired one of the stored memory addresses is selected under the control of the control unit 207 in accordance with a key input generated by a key manipulation of the user. Accordingly, the digital voice signal corresponding to the selected memory address is inputted to the voice decoder 204 which, in turn, decodes the digital voice signal into a corresponding analog voice signal.

The multiplexer 205 is adapted to output an analog voice signal inputted through the microphone 201 or an analog voice signal received from the voice decoder 204 under the control of the control unit 207. The analog voice signal outputted from the multiplexer 205 is preferably converted into a transmission signal meeting a code division multiple access (CDMA) system by the backward speech channel unit 208.

The converted signal from the backward speech channel unit 208 is then transmitted to a base station (not shown). To transmit analog voice signals in the form of digital packet data to the base station, the backward speech channel unit 208 preferably includes a voice encoder serving to produce compressed digital voice data converted from those analog voice signals.

Figure 3:
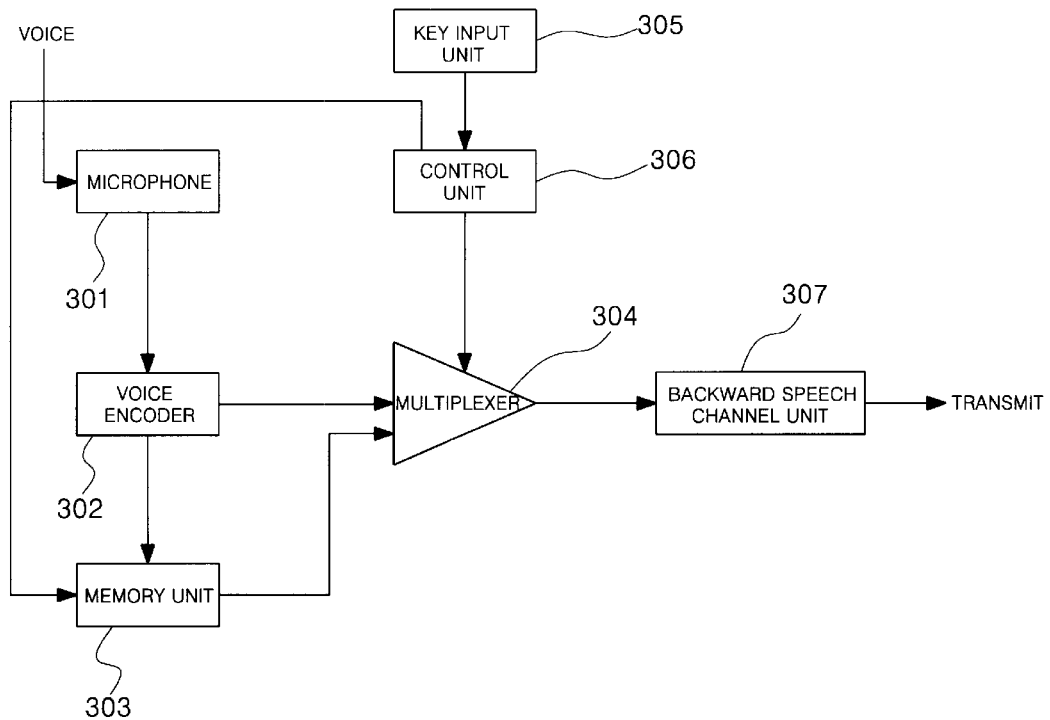
FIG. 3 is a block diagram illustrating another preferred embodiment of an apparatus for transmitting a call holding voice message in a mobile communication terminal in accordance with the present invention.

FIG. 3 is a block diagram illustrating a second preferred embodiment of an apparatus for transmitting a call holding voice message in a mobile communication terminal in accordance with the present invention. As shown in FIG. 3, the second preferred embodiment of the call holding voice message transmitting apparatus includes a microphone 301, a voice encoder 302, a memory unit 303, a multiplexer 304, a backward speech channel unit 307, a key input unit 305, and a control unit 306.

Operations of the second preferred embodiment of the apparatus will now be described. In order to allow a transmission of a call holding voice message in the call holding voice message transmitting apparatus according to the second preferred embodiment, it is necessary to previously store the call holding voice message in the mobile communication terminal, to which the call holding voice message transmitting apparatus is applied. This is similar to the apparatus of the first preferred embodiment.

To this end, the microphone 301 serves to convert a voice received from the user into a corresponding analog voice signal which is, in turn, applied to the voice encoder 302. In the voice encoder 302, the analog voice signal is encoded in a compressed digital voice signal for storing in the memory unit 303 or directly applying to the multiplexer 305.

The memory unit 303 receives the digital voice signal from the voice encoder 302, and then stores it in a memory location corresponding to a memory address preferably allocated in accordance with a control signal generated from the control unit 306 in response to a key input from the key input unit 305. Typically, the key input unit 305 generates a mode designation signal and a variety of key codes.

In this manner, the memory unit 303 is preferably repeatedly stored with a variety of digital voice signals in its memory locations respectively corresponding to different memory addresses. A desired one of the stored memory addresses is selected under the control of the control unit 306 in accordance with a key input generated by a key manipulation of the user. The digital voice signal corresponding to the selected memory address is then inputted to the multiplexer 304.

The multiplexer 304 outputs a digital voice signal received via the microphone 301 and voice encoder 302 or a digital voice signal read out from the memory unit 303 under the control of the control unit 306. The digital voice signal outputted from the multiplexer 304 is converted into a transmission signal meeting a CDMA system by the backward speech channel unit 307. The converted signal from the backward speech channel unit 307 is then transmitted to a base station (not shown).

In the apparatus according to the second preferred embodiment, it is unnecessary to use any voice decoder as used in the first preferred embodiment because the backward speech channel unit 307 receives compressed digital signals from the multiplexer 304. In order to transmit analog voice signals in the form of digital packet data to the base station, the backward speech channel unit 208 would preferably include a voice encoder serving to produce compressed digital voice data converted from those analog voice signals.

A method for transmitting a call holding voice message in the mobile communication terminal configured in accordance with the first or the second preferred embodiment of an apparatus for transmitting a call holding voice message of the present invention will now be described. The call holding voice message transmitting method involves a voice data storing procedure, a voice data read out procedure and a transmitting procedure. The voice data storing procedure stores voice data of the user of the terminal in the memory unit of the terminal in order to transmit an intended message to a caller in a situation in which it is impossible for the user to enter into a telephone conversation with the caller in response to an incoming call from the caller. The voice data transmitting procedure reads out the stored voice data from the memory, and the transmitting procedure transmits the read-out voice data to the caller.

Figure 4:
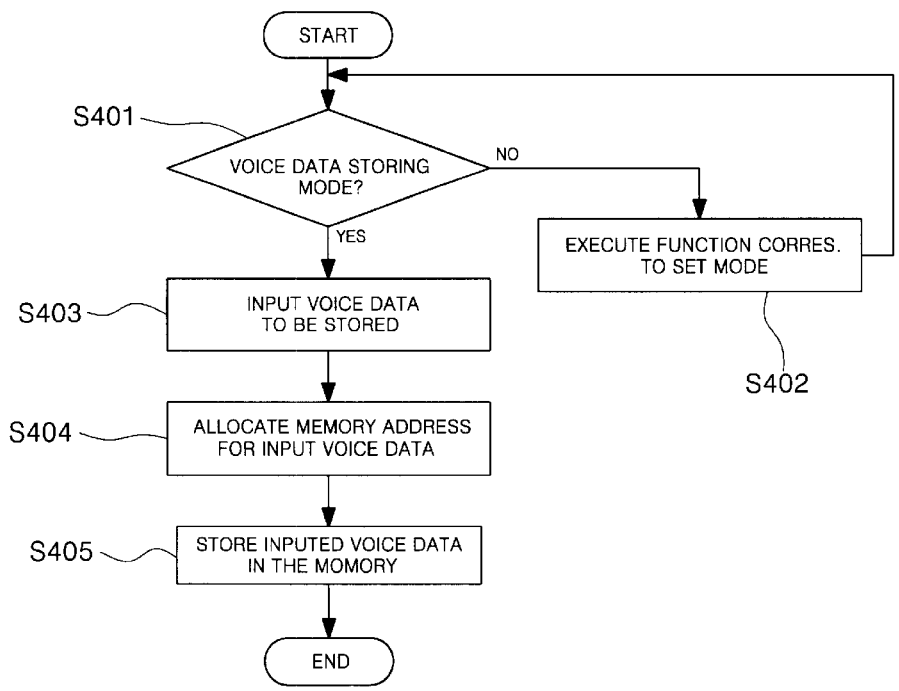
FIG. 4 is a flow chart illustrating a preferred embodiment of voice data storing procedure in which voice data is stored in a mobile communication terminal to achieve a transmission of a corresponding call holding voice message.

FIG. 4 is a flow chart illustrating a preferred embodiment of a voice data storing procedure in which voice data is stored in a memory location of a storage device included in the terminal in order to achieve a transmission of a corresponding call holding voice message. As shown in FIG. 4, the preferred embodiment of the voice data storing procedure can be performed in the mobile communication terminal having the first or second preferred embodiment of the apparatus and will be described first in conjunction with FIG. 2. Accordingly, after this procedure begins, the control unit 207 first determines whether or not the operation mode of the terminal corresponds to a voice data storing mode for storing voice data in the memory unit 203 at step S401.

Where the determination in step S401 is negative because the terminal is in an operation mode other than the voice data storing mode, the control unit 207 conducts a control for executing a function corresponding to that operation mode in step S402. On the other hand, when it is determined at step S401 that the operation mode of the terminal corresponds to the voice data storing mode, the control unit 207 allows the user to input voice data, which will be stored, to the terminal in step S403.

Thereafter, the control unit 207 receives a memory address allocated to store the inputted voice data from the key input unit 206 in step S404, and then stores the voice data in a memory location of the memory unit 203 corresponding to the memory address in step S405. However, the present invention is not intended to be so limited. For example, although the inputting of the memory address is executed following the inputting of the voice data in the above procedure, it may be executed before the inputting of the voice data. From step S405, the procedure ends.

FIG. 5 illustrates an exemplary variety of voice data stored, for example, in the memory unit 203 in accordance with the preferred embodiment of the voice data storing procedure as shown in FIG. 4 to be used as a call holding message. Thus, the user can input a voice message, "Hello, this is Kildong Hong," to the terminal via the microphone 201 in the voice data storing mode, and then can input a numeral "1" as a memory address to be allocated for the inputted voice message via the key input unit 206. In this case, the voice message (e.g., Hello, this is Kildong Hong) is rendered to be stored and then stored in a memory location of the memory unit 203 corresponding to the memory address number 1 as shown in FIG. 5.

In addition to the message, "Hello, this is Kildong Hong," other desired voice messages may be respectively stored in additional memory locations of the memory unit 203 while being allocated corresponding different memory addresses. As shown in FIG. 5, for example, such voice messages may include: (a) "I can't receive your call now. Please call me next time."; (b) "I will receive your call in a moment, but I am unable to have more than a very limited conversation with you owing to unavoidable circumstances."; (c) "Please wait a moment. I will receive your call after moving to another area."; (d) "I can't receive your call now. Please leave a message."; (e) "Please wait a moment. Don't hang-up."; and (f) "Sorry, please wait a moment and don't hang-up, if your call is important.". However, the present invention is not intended to be so limited.

After completion of the storing procedure for desired voice data such as those described above, a selected one of those stored voice data is preferably transmitted as a call holding voice message in a transmit stored voiced data mode. Thus, the selected call holding voice message is transmitted from the user's terminal to a caller in response to an incoming call from the caller in a situation in which it is impossible for the user to enter into a telephone conversation with the caller.

A first preferred embodiment of a call holding voice message transmitting method according to the present invention will now be described. The first preferred embodiment of the call holding voice messages transmitting method can be used with the preferred embodiments of the apparatus shown in FIGS. 2 and 3. As shown in FIG. 6, the first preferred embodiment of the call holding voice message transmitting method will be described in conjunction with FIG. 2.

As shown in FIG. 6, after a process starts the control unit 207 or the like can determine whether or not a command for transmitting a selected one of the voice data stored in the memory unit 203 is generated in a conversation mode (e.g., transmit stored voice data mode) in step S601. For example, whether or not a command for transmitting a selected one of the stored voice data is generated in the conversation mode can be determined by judging whether or not a memory address corresponding to one of the stored voice data is inputted by a terminal user in the conversation mode.

When it is determined at step S601 that there is no command for transmitting the voice data stored in the memory unit 203, in step S602 the control unit 207 controls the multiplexer 205 or the like to transmit an analog voice signal from the microphone 201 to the backward speech channel unit 208. Under the control of the control unit 207, the backward speech channel unit 208 can convert the received analog voice signal into a transmission signal preferably meeting the CDMA system, and then transmits the transmission signal to a base station (not shown) in step S602 and the process ends.

On the other hand, when it is determined in step S601 that there is a command for transmitting the voice data stored in the memory unit 203, the control unit 207 controls the memory unit 203 and multiplexer 205 so that voice data corresponding to the input memory address is inputted to the backward speech channel unit 208 in step S603. Further, the voice data inputted to the backward speech channel unit 208 can be converted into a transmission signal preferably meeting the CDMA system, and then transmitted to a base station (not shown) in step S603 and the process ends.

Procedures for applying the voice data outputted from the memory unit 203 to the multiplexer 205 will now be described in additional detail. When a memory address corresponding to one of the memory locations of the memory unit 203 stored with respective voice data is inputted to the terminal in the conversation mode, the control unit 207 controls the memory unit 203 to output the voice data stored in the input memory address in the form of a digital voice signal to the voice decoder 204. The voice decoder 204 then converts the received digital voice signal into a corresponding to an analog voice signal, and outputs the analog voice signal to the multiplexer 205.

Generation of a key input adapted to read out voice data stored in the memory unit 203 may be achieved using a menu function typically included in mobile communication terminals. For example, a method may be used in which all messages stored in the memory unit are displayed on the screen of the terminal along with corresponding memory address numbers so that the user can select a desired one of those messages using a select key.

Alternatively, a key depression holding method may be used to send out voice data stored in the terminal. The key depression holding method is a method in which a combination of keys corresponding to a desired memory address is prolongedly depressed in the conversation mode. For such a key depression holding method, there may be a method in which the memory unit is accessible in response to a rapid successive key depression, and a method in which the memory unit is accessible in response to a momentarily prolonged key depression greater than a prescribed length of time. For a memory address having two digits, the corresponding voice message can be read out by a key depression in which the key corresponding to the first digit of the memory address is rapidly depressed while the key corresponding to the second digit of the memory address is depressed in a prolonged fashion.

Although a variety of key inputting methods have been described, those skilled in the art will appreciate that additional methods may be implemented within the scope of the present invention. Thus, the present invention is not intended to be so limited to the described key inputting methods.

Figure 7:
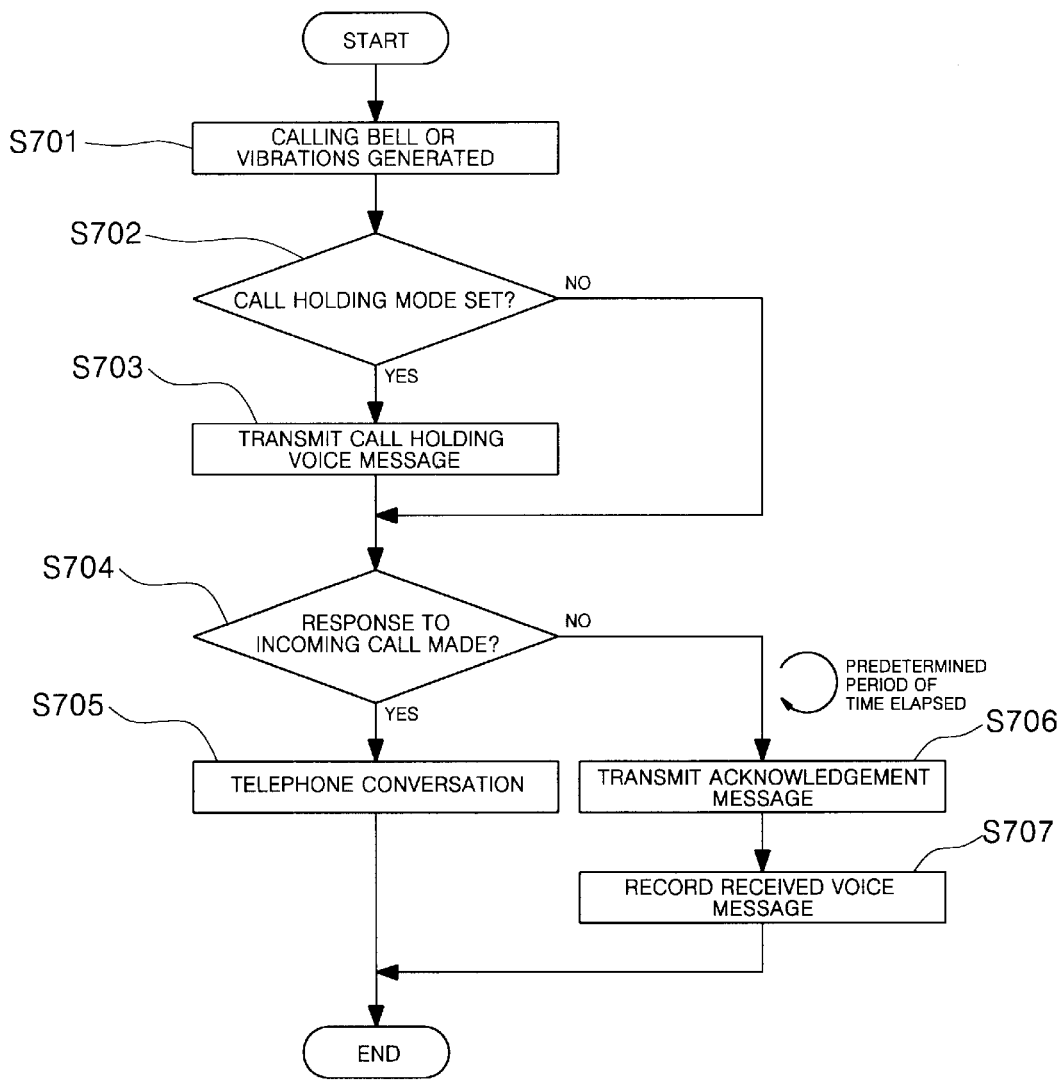
FIG. 7 is a flow chart illustrating another preferred embodiment of a call holding voice message transmitting method in accordance with the present invention.

FIG. 7 is a flow chart illustrating a second preferred embodiment of a method for transmitting a call holding voice message in the mobile communication terminal in accordance with the present invention. The second preferred embodiment of the method to transmit a call holding voice message can be performed, for example, by the first and second preferred embodiments of an apparatus as respectively shown in FIGS. 2 and 3.

As shown in FIG. 7, after a process starts, control continues to step S701 where calling bells or vibrations are generated from the terminal in response to the incoming call. When the user of the terminal is required to receive an incoming call from a caller under the condition in which he cannot respond normally to the incoming call, he depresses a call holding button to set the terminal into an incoming call holding mode. However, the second preferred embodiment is not intended to be so limited. For example, the terminal could have been set in the incoming call holding mode when the user entered the conditions preventing normal response, or a subsequent time prior to receipt of the call.

If the terminal is determined to be in the incoming call holding mode in step S702, control continues to step S703 where the terminal transmits a call holding voice message, stored therein, to the caller via its message transmission system. The call holding voice message may be one of the exemplary messages illustrated in FIG. 5.

In a state in which the user does not set the terminal into the incoming call holding mode, that is, he does not depress the call holding button, it is determined that the terminal is not in the call holding mode in step S702 and control jumps to step S704. In step S704, it is determined whether or not the user responds to the incoming call within a predetermined period of time.

This determination can be achieved preferably by determining whether the user depresses the conversation button of the terminal within the predetermined period of time. If it is determined in step S704 that the user depresses the conversation button within the predetermined period of time, control continues to step S705 where the incoming call is then normally received to allow the user to enter into a normal telephone conversation with the caller.

However, if it is determined that there is no response from the user to the incoming call within the predetermined period of time in step S704, that is, if the user does not depress the conversation button in the incoming call holding mode within the predetermined period of time, control jumps to step S706. In step S706, a desired acknowledgment message is automatically transmitted to the caller. For example, the acknowledgment message may be "Sorry, I can't receive your call now. Please leave a message.", "Sorry to have you kept waiting. I can't receive your call now. Please leave a message.", and etc. For such an acknowledgment message, messages previously stored in the terminal by the manufacturer during the manufacture of that terminal or by the user after the purchase of the terminal may be used.

In accordance with the transmission of such an acknowledgment message in step S706, the caller is requested for a transmission of a voice message. The voice message from the caller is then received at the terminal of the user and recorded in the memory unit in step S707.

Thus, in the second preferred embodiment of the method for transmitting a call holding message, when there is no response from the user to the incoming call within the predetermined period of time even though the incoming call holding mode is not set, steps S706 and S707 are preferably executed. That is, the terminal transmits the acknowledgment message to the caller at step S706. Subsequently, a voice message transmitted from the caller in response to the acknowledgment message is preferably recorded in the memory unit at step S707. From steps S705 and S707, the process ends.

Although a description has been made in which most voice data adapted to be used as a call holding voice message are voice messages directly stored in the memory unit of the terminal by the user, the present invention is not intended to be so limited. For example, call holding voice messages may also be a variety of voice messages previously stored by the manufacturer in the manufacture of that terminal. In this case, the user can use the manufacturer stored voice messages in accordance with the preferred embodiments.

As described above, preferred embodiments according to the present invention provides a call holding voice message transmitting apparatus and method in a mobile communication terminal having various advantages. The preferred embodiments of a call holding voice message transmitting apparatus and method can transmit a variety of voice data, stored in a memory equipped in the terminal, to a caller in a situation in which it is impossible for the user to enter into a telephone conversation with the caller in response to an incoming call from the caller. Thus, the preferred embodiments allow the user to effectively cope with the incoming call. Accordingly, a percentage of completed calls increases and a system efficiency increases. Further, the user can respond to the incoming call without incurring the displeasure of those around him.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transmitting a call holding voice message in a mobile communication terminal, comprising:

an input unit that inputs a command to the terminal;

a control unit that generates a control signal adapted to execute the command from the input unit;

a first converter that converts a voice inputted to the terminal-, into a corresponding first analog voice signal;

a second converter that converts the first analog voice signal outputted from the first converter into a first digital voice signal;

a memory allocated with a plurality of memory addresses, wherein the memory allocates a selected one of the memory addresses for the first digital voice signal;

a third converter that converts a second digital voice signal output by the memory into a second analog voice signal;

a multiplexer that receives the first and the second analog voice signals and outputs a selected one of the first and second analog voice signals in response to the control signal received from the control unit; and an output converter that converts the selected analog voice signal from the multiplexer into a signal meeting a transmission system used in association with the terminal.

2. The apparatus of claim 1, wherein the output converter has a fourth converter that converts the selected analog voice signal output by the multiplexer into the selected digital voice signal.

3. The apparatus of claim 2, wherein the third converter is a voice decoder adapted to decode the digital voice signal stored in the memory into the corresponding second analog voice signal.

4. The apparatus of claim 2, wherein the fourth converter converts the selected analog voice signal from the multiplexer into the signal that satisfies a code division multiple access transmission system.

5. The apparatus of claim 2, wherein the fourth converter comprises a voice encoder that converts the selected analog voice signal into the signal being a third digital voice signal.

6. The apparatus of claim 1, wherein the input of the command by the input unit uses a key depression holding method.

7. The apparatus of claim 1, wherein the input of the command by the input unit displays voice data corresponding to the digital voice signal stored in the memory on a screen of the terminal, and allows a user of the terminal to select the displayed voice data.

8. The apparatus of claim 1, wherein the first digital signal and the second digital signal ate the same signal.

* * * * *